Patented July 3, 1951

2,559,147

UNITED STATES PATENT OFFICE 2,559,147

PREPARATION OF DIBASIC AROMATIC ACIDS BY OXIDATION

William S. Emerson, Theodore C. Shafer, and Robert A. Heimsch, Dayton, Ohio, assignors to Monsanto Chemical Company, St. Louis, Mo., a corporation of Delaware No Drawing. Application May 24, 1949, Serial No. 95,173

5 Claims. (Cl. 260—524)

This invention relates to a novel method of preparing carboxylic acids by the catalytic oxidation of alkyl substituted benzenes. More particularly the invention relates to the oxidation of salts of alkyl substituted aromatic acids in aqueous solution by means of gaseous oxygen in the presence of oxides and hydroxides of silver, lead and selenium.

The liquid phase oxidation of alkylbenzenes is well known, but is not generally useful in the preparation of dibasic acids because of the low yields. Although methods of oxidation now known are useful in the preparation of toluic acid from xylene, these methods will not generally produce high yields of dibasic acid by oxidation of the second methyl group. In application Serial No. 95,169, filed May 24, 1949, by William S. Emerson, there is described and claimed a method of oxidation of aqueous solutions of salts of the substituted aromatic acids by means of oxygen containing gases. This method is operative without the presence of catalysts.

The primary purpose of the present invention is to provide a catalytic method of oxidizing salts of alkyl substituted aromatic acids. A further purpose of the present invention is to provide a novel method of preparing substantial yields of dibasic acids, particularly terephthalic acid and isophthalic acid. A still further purpose of the invention is to provide a rapid, safe oxidation method utilizing oxygen or oxygen enriched air for the oxidation of alkyl groups attached to aromatic nuclei. Still further purposes will be apparent from the following description of the invention.

This oxidation method is useful to oxidize alkyl groups attached to benzene rings where the benzene ring also contains a solubilizing substituent, for example a carboxylic acid group, a sulfonic acid group or an oxyacetic acid group. Suitable compounds for the practice of this invention are compounds of the general formula:

wherein R is an alkyl radical having up to four carbon atoms, $n$ and $m$ are small whole numbers from one to three, inclusive, and X is a radical of the group consisting of

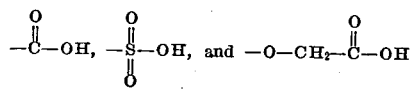

It has now been found that the basic invention of William S. Emerson, referred to above, may be advantageously conducted in the presence of oxides and hydroxides of silver, lead and selenium, for example silver hydroxide, lead dioxide, selenium dioxide, silver oxide, and lead monoxide. The catalysts may advantageously be used in the amount of from 0.05 to ten percent of the weight of the aromatic acid being oxidized. Through the use of these catalysts higher yields and conversions are obtained. This is especially true if an unstirred autoclave is used. If the reactor is provided with an efficient stirring mechanism the increases in yields gained through the use of the catalysts are sometimes not substantial, however, these modest improvements in yield are accompanied by very substantial increases in the conversion.

In this specification the uses of the words "conversion" and "yield" have been used in the strict sense. The conversion refers to the amount of the desired product prepared by the oxidation of the alkyl substituted aromatic acid charged to the reactor. The expression "yield" is the amount of desired product prepared from the alkyl substituted aromatic acid which was consumed by the oxidation. In general the yields will be higher than the conversions. However, where little or no unreacted product remains after the completion of the oxidation, the yields and conversions will be substantially identical. In general the yields are of greatest importance. However, it is desirable to have both high yields and high conversions to avoid excessive separation of raw materials from product for return to the reaction vessel.

The oxidation is conducted in aqueous solution and therefore the alkyl substituted aromatic acid is charged to a suitable reaction vessel in the presence of catalyst and sufficient alkali metal compound to convert the acids into the water soluble salts of the alkali metals. Suitable alkali metal compounds are the hydroxides, for example sodium hydroxide and potassium hydroxide, and the alkali metal salts of acids weaker than the acid being oxidized, for example sodium carbonate, potassium carbonate, sodium acetate, and sodium carbamate. Thereafter the aqueous solution is subjected to an elevated temperature, for example from 200 to 350° C., in the presence of an oxygen containing gas. The reaction is conducted in a closed vessel adapted to permit the intimate mixing of the aqueous solution with the oxygen containing gas. If desired a closed autoclave provided with a mechanical stirring device may be used, or a tower provided with packing or with bubble plates to insure intimate mixing of reagents. Since water is present, the pressure at which the reaction is conducted must exceed the vapor pressure of water at the temperature employed. The amount of oxygen containing gas used is determined by the pressure in excess of the vapor pressure of water.

The oxidation may be conducted with air, with oxygen, or with any mixture of air and oxygen. A convenient method of conducting the reaction involves the providing of a stream of oxidizing gas from a constant pressure source, and permitting the reaction to take up the oxygen as rapidly as feasible under the conditions involved. Since the reaction is exothermic, increases in temperature and pressure may result which retard the flow of oxygen until such time as the vigorous action and its incident pressure subsides. Although temperatures from 200 to 350° C. are possible, the preferred reaction will involve temperatures from 250 to 300° C.

An alternative method of conducting the oxidation involves the charging of high pressure oxygen and the other reactant into a closed vessel and heating to complete the reaction. The new oxidation method may also be operated in a continuous or semi-continuous manner by withdrawal of a stream of reactants from which the desired polybasic acids are removed and the unreacted materials recycled to the reactor. The removal of the stream of materials may obviously be either continuous or periodic. In either case the unreacted raw materials are returned to the reactor with sufficient additional raw materials to fully charge the reaction vessel. The continuous or semi-continuous methods are well adapted for operation with the packed tower type of reactor. These and other variations in the method of conducting the new reaction will be apparent to one skilled in the art.

The dibasic acids prepared in accordance with this method may be separated from the unreacted reagents and by-products by filtering off the catalyst and other residue and acidifying with a strong acid, for example hydrochloric acid to convert the sodium salts to the corresponding acids. The acids may then be separated by filtration. Frequently the product may contain substantial portions of the raw material or a plurality of acid products formed by the oxidation. In such cases the desired acid may be separated by fractional distillation of the esters or acid chlorides, prepared from the acids by conventional esterification procedures, or by reaction with thionyl chloride. Other conventional chemical and physical methods of separation may be used which will be apparent to one skilled in the art.

In accordance with this invention p-toluic acid, m-toluic acid, o-toluic acid, p-ethylbenzoic acid, cumic acid, and other alkyl substituted benzoic acids may be used. Similarly, the alkyl substituted benzenesulfonic acids, for example p-toluenesulfonic acid and the alkyl substituted phenoxyacetic acids, for example p-methylphenoxyacetic acid, are also useful. A plurality of alkyl groups may be present in which case one or more of the groups may be oxidized in accordance with this technique as in the case of 3,5-dimethylbenzoic acid. The method is particularly useful in the preparation of phthalic acid, isophthalic acid and terephthalic acid.

Further details of this oxidation method are set forth with respect to the following specific examples.

*Example 1*

An unstirred autoclave provided with a source of oxygen at 700 pounds per square inch, was charged with 450 grams of water, 73.5 grams of sodium hydroxide, and 100 grams of p-toluic acid, prepared by the catalytic partial oxidation of p-xylene. The reactor was heated to 240° C. for six hours while oxygen was passed through the mixture. A yield of 33.3 percent of terephthalic acid was produced.

*Example 2*

An autoclave provided with a mechanical stirring device was charged with 675 grams of water, 110 grams of sodium hydroxide and 150 grams of a crude p-toluic acid prepared by the catalytic partial oxidation of p-xylene. The autoclave was provided with a source of oxygen at 1000 pounds per square inch pressure and the reaction was permitted to run for one hour at temperatures between 260° C. and 275° C. with constant stirring. At the completion of the reaction the product was analyzed by measuring the neutral equivalent and was found to have resulted in a yield of 63.5 percent of terephthalic acid.

*Example 3*

The procedure of Example 1 was repeated, except that one percent of selenium dioxide was used as a catalyst. A yield of 46 percent of terephthalic acid was recovered.

*Example 4*

The procedure of Example 1 was repeated, except that one percent of lead dioxide was used to catalyze the reaction. The terephthalic acid was recovered in a 54.5 percent yield.

*Example 5*

The procedure of Example 2 was repeated, except that one percent of silver hydroxide was added as a catalyst. The terephthalic acid was recovered in a yield of 66.7 percent with a conversion of 47.6 percent.

The invention is defined by the following claims.

We claim:

1. A method of preparing polybasic acids, which comprises mixing in an aqueous solution an acid of the group consisting of the acids of the formula:

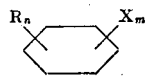

wherein R is an alkyl group having up to four carbon atoms, $n$ and $m$ are small whole numbers from one to three, inclusive, and X is a radical of the group consisting of

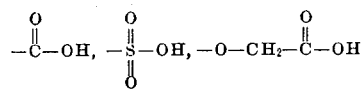

and an alkali metal compound of the group consisting of alkali metal hydroxides and alkali metal salts of acids weaker than the acid being oxidized, in sufficient amount to convert the acid to its salt, heating the resulting solution to a temperature between 200 and 350° C. with oxygen containing gas, in the presence of a compound of the group consisting of the oxides and hydroxides of silver, and separating the resulting product, the reaction mass being substantially free of hydrocarbons.

2. A method of preparing polybasic acids, which comprises mixing in an aqueous solution an acid of the group consisting of the acids of the formula:

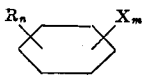

wherein R is an alkyl group having up to four carbon atoms, $n$ and $m$ are small whole numbers from one to three, inclusive, and X is a radical of the group consisting of

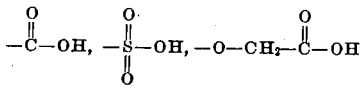

and an alkali metal compound of the group consisting of alkali metal hydroxides and alkali metal salts of acids weaker than the acid being oxidized, in sufficient amount to convert the acid to its salt, heating the resulting solution to a temperature between 200 and 350° C. with an oxygen containing gas, in the presence of from 0.05 to ten percent (based on the weight of the aromatic acid being oxidized), of a compound of the group consisting of the oxides and hydroxides of silver, the reaction mass being substantially free of hydrocarbons.

3. A method of preparing polybasic acids, which comprises mixing in an aqueous solution an alkyl substituted benzoic acid and an alkali metal compound of the group consisting of the alkali metal salts of acids weaker than the acid being oxidized, in sufficient amount to convert the acid to its salt, heating the resulting solution to a temperature between 200 and 350° C. with oxygen, in the presence of from 0.05 to ten percent (based on the weight of the acid being oxidized), in the presence of a compound of the group consisting of the oxides and hydroxides of silver, the reaction mass being substantially free of hydrocarbons.

4. A method of preparing dibasic acids, which comprises mixing in an aqueous medium, a toluic acid and sufficient alkali metal hydroxide to convert the acid to its salt, heating the resulting solution to a temperature between 250 and 300° C. with oxygen, in the presence of from 0.05 to ten percent (based on the weight of the acid being oxidized), of a compound of the group consisting of the oxides and hydroxides of silver, the reaction mass being substantially free of hydrocarbons.

5. A method of preparing terephthalic acid, which comprises mixing in an aqueous medium, p-toluic acid and sodium hydroxide, heating the resulting solution to a temperature between 250 and 300° C. with oxygen, in the presence of from 0.05 to ten percent (based on the weight of the acid being oxidized), of silver hydroxide, the reaction mass being substantially free of hydrocarbons.

WILLIAM S. EMERSON.
THEODORE C. SHAFER.
ROBERT A. HEIMSCH.

REFERENCES CITED

The following references are of record in the file of this patent:

UNITED STATES PATENTS

| Number | Name | Date |
|---|---|---|
| 1,721,958 | James | July 23, 1929 |
| 2,245,528 | Loder | June 10, 1941 |
| 2,276,774 | Henke et al. | Mar. 17, 1942 |
| 2,302,462 | Palmer et al. | Nov. 17, 1942 |
| 2,479,067 | Gresham | Aug. 16, 1949 |

FOREIGN PATENTS

| Number | Country | Date |
|---|---|---|
| 364,442 | Germany | Nov. 25, 1922 |

OTHER REFERENCES

Shrader and others, Beilstein (Handbuch, 4th ed.), vol. 9, 2nd suppl., p. 611 (1949).